United States Patent
Wang et al.

(10) Patent No.: US 8,929,303 B2
(45) Date of Patent: Jan. 6, 2015

(54) CONTROL AND DATA CHANNELS FOR ADVANCED RELAY OPERATION

(75) Inventors: Yan Wang, Plano, TX (US); Jianzhong Zhang, Irving, TX (US); Joonyoung Cho, Kyeonggi (KR); Jin-kyu Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 647 days.

(21) Appl. No.: 12/732,547

(22) Filed: Mar. 26, 2010

(65) Prior Publication Data
US 2010/0281323 A1 Nov. 4, 2010

Related U.S. Application Data

(60) Provisional application No. 61/212,027, filed on Apr. 6, 2009.

(51) Int. Cl.
| | |
|---|---|
| H04W 28/06 | (2009.01) |
| H04B 7/26 | (2006.01) |
| H04B 7/155 | (2006.01) |
| H04W 16/26 | (2009.01) |
| H04W 88/04 | (2009.01) |

(52) U.S. Cl.
CPC ............ H04B 7/2606 (2013.01); H04W 16/26 (2013.01); H04B 7/15507 (2013.01); H04W 28/06 (2013.01); H04W 88/04 (2013.01)
USPC .......................................... 370/329; 370/315

(58) Field of Classification Search
CPC ............ H04L 5/0053; H04W 84/047; H04W 56/0045
USPC ................................................. 370/315, 329
See application file for complete search history.

(56) References Cited

U.S. PATENT DOCUMENTS

| | | | |
|---|---|---|---|
| 2008/0013606 A1* | 1/2008 | Boariu et al. | 375/211 |
| 2008/0045270 A1* | 2/2008 | Suga | 455/561 |
| 2008/0070582 A1 | 3/2008 | Cai | |
| 2008/0165881 A1 | 7/2008 | Tao et al. | |
| 2008/0227386 A1 | 9/2008 | Dayal et al. | |

(Continued)

FOREIGN PATENT DOCUMENTS

| | | |
|---|---|---|
| CN | 101106807 A | 1/2008 |
| EP | 1919143 A2 | 5/2008 |
| WO | WO 2008/049843 A1 | 5/2008 |

OTHER PUBLICATIONS

Samsung, "L1 Relay Design and Operations", 3GPP TSG RAN WG1 #55bis, R1-090108, Jan. 12-16, 2009, Ljubljana, Slovenia, pp. 1-3.*

(Continued)

*Primary Examiner* — Benjamin Lamont

(57) ABSTRACT

A relay station in a wireless communication system is configured to relay communications between the base station and a plurality of subscriber stations. The relay station includes at least one antenna configured to transmit and receive data and control information. The relay station also includes a controller coupled to the antenna. The controller is configured to transmit control information to a subscriber station during a first set of symbols in a relay station to subscriber station (RS-to-SS) subframe. The controller also switches the antenna to a receive mode; and receives control information during a second set of symbols in the RS-to-SS subframe.

38 Claims, 12 Drawing Sheets

(56) References Cited

U.S. PATENT DOCUMENTS

2008/0232319 A1* 9/2008 Son et al. ............... 370/329
2009/0252075 A1* 10/2009 Ji et al. ............... 370/312
2010/0120442 A1* 5/2010 Zhuang et al. ............... 455/450
2011/0222428 A1* 9/2011 Charbit et al. ............... 370/252

OTHER PUBLICATIONS

Samsung, Discussion on L3 Relay for LTE-A, R1-083568, 3GPP TSG RAN WG1 meeting #54bis, Prague, Czech Republic, Sep. 29-Oct. 3, 2008, pp. 1-8.*
Qualcomm Europe, Support of Rel-8 UEs by LTE-A Relays, R1-084054, 3GPP RAN WG1 #54bis, Prague, Czech Republic, Sep. 29-Oct. 3, 2008, pp. 1-18.*
LG Electronics, Resource Allocation and Downlink Control Channel Structure for Relay Backhaul Link, R1-091194, 3GPP TSG RAN WG1 meeting #56bis, Seoul, Korea, Mar. 23-27, 2009, pp. 1-7.*
International Search Report dated Nov. 19, 2010 in connection with International Patent Application No. PCT/KR2010/002113.
3GPP TSG RAN WG1 Meeting #56bis, "Resource Allocation and Downlink Control Channel Structure for Relay Backhaul Link", LG Electronics, Mar. 23-27, 2009, 7 pages.
Translated Japanese Office Action dated Feb. 26, 2013 in connection with a counterpart Japanese Patent Application, 4 pages.
3GPP TSG RAN WG1 Meeting #58bis, "Discussion paper on the control channel and data channel optimization for relay link", R1-091384; Nortel, Mar. 23, 2009, 9 pages.
3GPP TSG RAN WG1 Meeting #58bis, "Relay Link Control Signalling", R1-091151; Research in Motion, UK Limited; Mar. 23, 2009, 5 pages.
Translated Japanese Office Action dated Dec. 20, 2013 in connection with Japanese Patent Application No. 2012-504608; 5 pages.
Translated Chinese Office Action dated Nov. 5, 2013 in connection with Chinese Patent Application No. 2010800229114; 27 pages.
3GPP RAN WG1 #54bis; "Support of Rel-8 UEs by LTE-A Relays"; Prague, Czec Republic; Sep. 29-Oct 3, 2008; 18 pages.
Translated Japanese Notice of Allowance dated Oct. 7, 2014 in connection with Japanese Patent Application No. 2012-504608; 6 pages.
TSG-RAN WG1 #55; "Efficient support of relays through MBSFN subframes"; Prague, Czec Republic; Nov. 10-14, 2008; 3 pages.

* cited by examiner

CONTROL AND DATA CHANNELS FOR ADVANCED RELAY OPERATION

CROSS-REFERENCE TO RELATED APPLICATION(S) AND CLAIM OF PRIORITY

The present application is related to U.S. Provisional Patent Application No. 61/212,027, filed Apr. 6, 2009, entitled "CONTROL AND DATA CHANNELS FOR ADVANCED RELAY OPERATION". Provisional Patent Application No. 61/212,027 is assigned to the assignee of the present application and is hereby incorporated by reference into the present application as if fully set forth herein. The present application hereby claims priority under 35 U.S.C. §119(e) to U.S. Provisional Patent Application No. 61/212,027.

TECHNICAL FIELD OF THE INVENTION

The present application relates generally to wireless communications and, more specifically, to a control and data channels for relay nodes in a wireless communication system.

BACKGROUND OF THE INVENTION

Relay stations (hereinafter "RS") are added to wireless communication networks to increase the coverage range, user data rates, or both, at the periphery of the cellular coverage area. A multi-hop network facilities communication occurs between a base station (hereinafter "BS") and subscriber stations (also referred to as mobile stations, "MS") in the extended coverage area provided by a relay station. In a multi-hop network, a signal from a source may reach its destination in multiple hops through the use of the Relay stations. Relay stations typically boost the downlink (base station to the subscriber station) and uplink (subscriber station to the base station) signals regardless of whether the relay station is a fixed relay station (hereinafter "RS") or a mobile relay station. Current systems fail to effectively increase relay system coverage while employing power saving mechanisms for the relay station. Moreover, no procedures are currently available for effectively managing load conditions, such as the number of received and transmitted data and acknowledgment packets

SUMMARY OF THE INVENTION

A relay station is provided. The relay station includes at least one antenna configured to transmit and receive data and control information. The relay station also includes a controller coupled to the antenna. The controller is configured to transmit control information to a subscriber station during a first set of symbols in a relay station to subscriber station (RS-to-SS) subframe. The controller also receives control information during a second set of symbols in the RS-to-SS subframe. The controller is also configured to determine a start symbol of the second set of symbols based on a bandwidth.

A relay station is provided. The relay station includes at least one antenna configured to transmit and receive data and control information. The relay station also includes a controller coupled to the antenna. The controller is configured to identify multiple resource allocations for backhaul data distributed in at least one subframe from a single scheduling allocation.

A relay station is provided. The relay station includes at least one antenna configured to transmit and receive data and control information. The relay station also includes a controller coupled to the antenna. The controller is configured to transmit control information to a subscriber station during a first set of symbols in a relay station to subscriber station (RS-to-SS) subframe. The controller also receives control information during a second set of symbols in the RS-to-SS subframe. The controller is also configured to receive the control information in the second set of symbols starting at a $4^{th}$ symbol regardless of a bandwidth size.

A wireless communication system is provided. The wireless communication system includes at least one base station and at least one relay station. The relay station is configured to relay communications between the base station and a plurality of subscriber stations. The relay station includes at least one antenna configured to transmit and receive data and control information. The relay station also includes a controller coupled to the antenna. The controller is configured to transmit control information to a subscriber station during a first set of symbols in a relay station to subscriber station (RS-to-SS) subframe. The controller also receives control information during a second set of symbols in the RS-to-SS subframe. The controller is also configured to determine a start symbol of the second set of symbols based on a bandwidth.

A wireless communication system is provided. The wireless communication system includes at least one base station and at least one relay station. The relay station is configured to relay communications between the base station and a plurality of subscriber stations. The relay station includes at least one antenna configured to transmit and receive data and control information. The relay station also includes a controller coupled to the antenna. The controller is configured to identify multiple resource allocations for backhaul data distributed in at least one subframe from a single scheduling allocation.

A wireless communication system is provided. The wireless communication system includes at least one base station and at least one relay station. The relay station is configured to relay communications between the base station and a plurality of subscriber stations. The relay station includes at least one antenna configured to transmit and receive data and control information. The relay station also includes a controller coupled to the antenna. The controller is configured to transmit control information to a subscriber station during a first set of symbols in a relay station to subscriber station (RS-to-SS) subframe. The controller also receives control information during a second set of symbols in the RS-to-SS subframe. The controller is also configured to receive the control information in the second set of symbols starting at a $4^{th}$ symbol regardless of a bandwidth size.

A method of relaying communications is provided. The method includes receiving data and control information. The method also includes transmitting control information to a subscriber station during a first set of symbols in a relay station to subscriber station (RS-to-SS) subframe. Further, the method includes determining a start symbol of a second set of symbols in the RS-to-SS subframe based on a bandwidth; and receiving control information during the second set of symbols.

A method of relaying communications is provided. The method includes receiving data and control information. The method also includes transmitting control information to a subscriber station during a first set of symbols in a relay station to subscriber station (RS-to-SS) subframe. Further, the method includes receiving control information during a second set of symbols in the RS-to-SS subframe starting at a fourth symbol regardless of bandwidth size.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Further, the term "cell" is a logic concept that can represent a "base station" or a "sector" belongs to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" used below.

Figure 1:
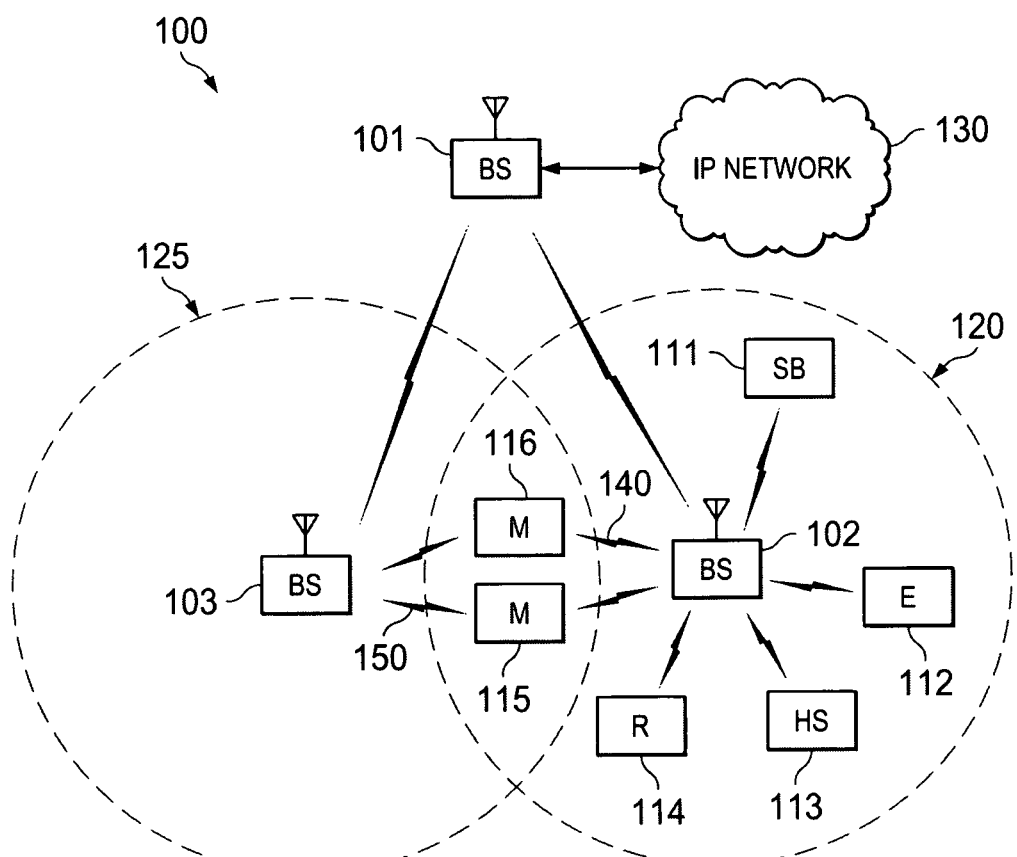
FIG. 1 illustrates exemplary wireless network 100 that is capable of decoding data streams according to embodiments of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using a minimum mean square error-Schwarz information criterion (MMSE-SIC) algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
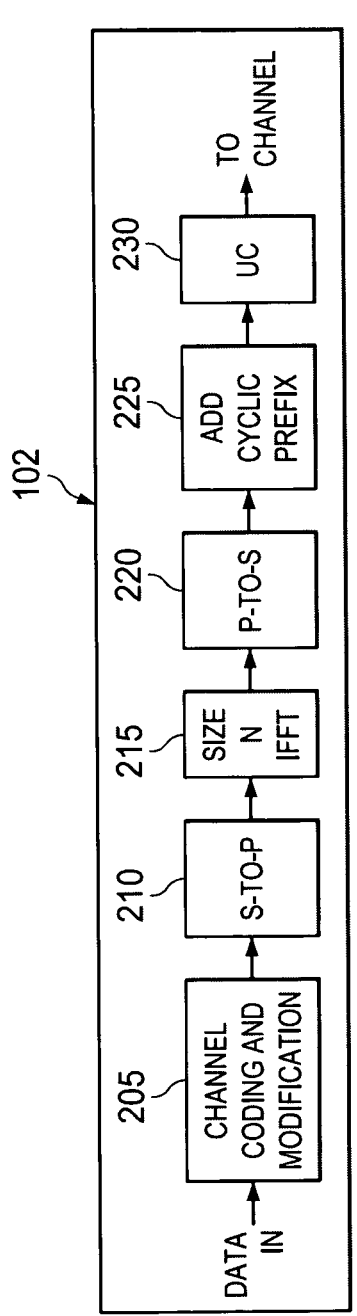
FIGS. 2A through 2B illustrate a high-level diagram of an orthogonal frequency division multiple access (OFDMA) transmit and receive paths according to embodiments of the present disclosure.
Figure 2B:
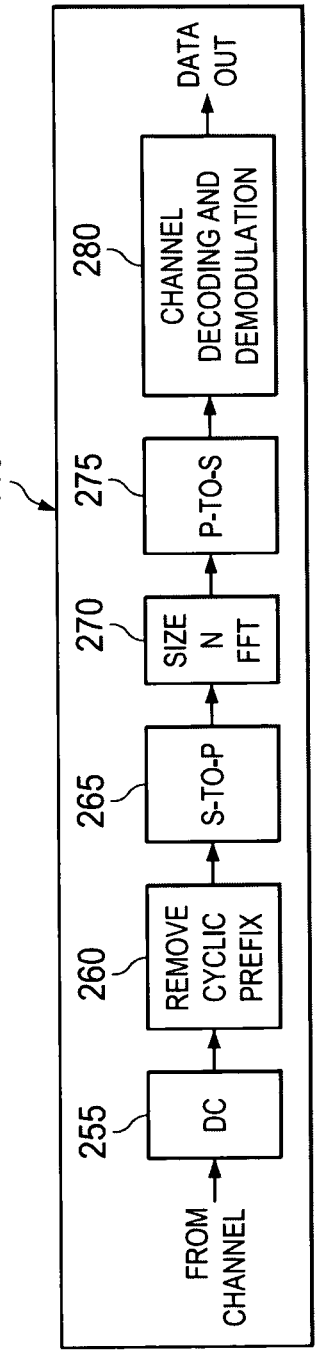

FIG. 2A illustrates a high-level diagram of an orthogonal frequency division multiple access (OFDMA) transmit path. FIG. 2B illustrates a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, and so forth), while for FFT and IFFT functions, the value of the N variable may be any integer number that is a power of two (i.e., 1, 2, 4, 8, 16, and so forth).

In BS 102, channel coding and modulation block 205 receives a set of information bits, applies coding (such as Turbo coding) and modulates (such as QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RE signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes methods and systems to convey information relating to base station configuration to subscriber stations and, more specifically, to relaying base station antenna configuration to subscriber stations. This information can be conveyed through a plurality of methods, including placing antenna configuration into a quadrature-phase shift keying (QPSK) constellation (such as n-quadrature amplitude modulation (QAM) signal, wherein n is $2^x$) and placing antenna configuration into the error correction data (such as cyclic redundancy check (CRC) data). By encoding antenna information into either the QPSK constellation or the error correction data, the base stations 101-103 can convey base stations 101-103 antenna configuration without having to separately transmit antenna configuration. These systems and methods allow for the reduction of overhead while ensuring reliable communication between base stations 101-103 and a plurality of subscriber stations.

In some embodiments disclosed herein, data is transmitted using QAM. QAM is a modulation scheme which conveys data by modulating the amplitude of two carrier waves. These two waves are referred to as quadrature carriers, and are generally out of phase with each other by 90 degrees. QAM may be represented by a constellation that comprises $2^x$ points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that with constellations with more than four points additional information (such as reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the subscriber station, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
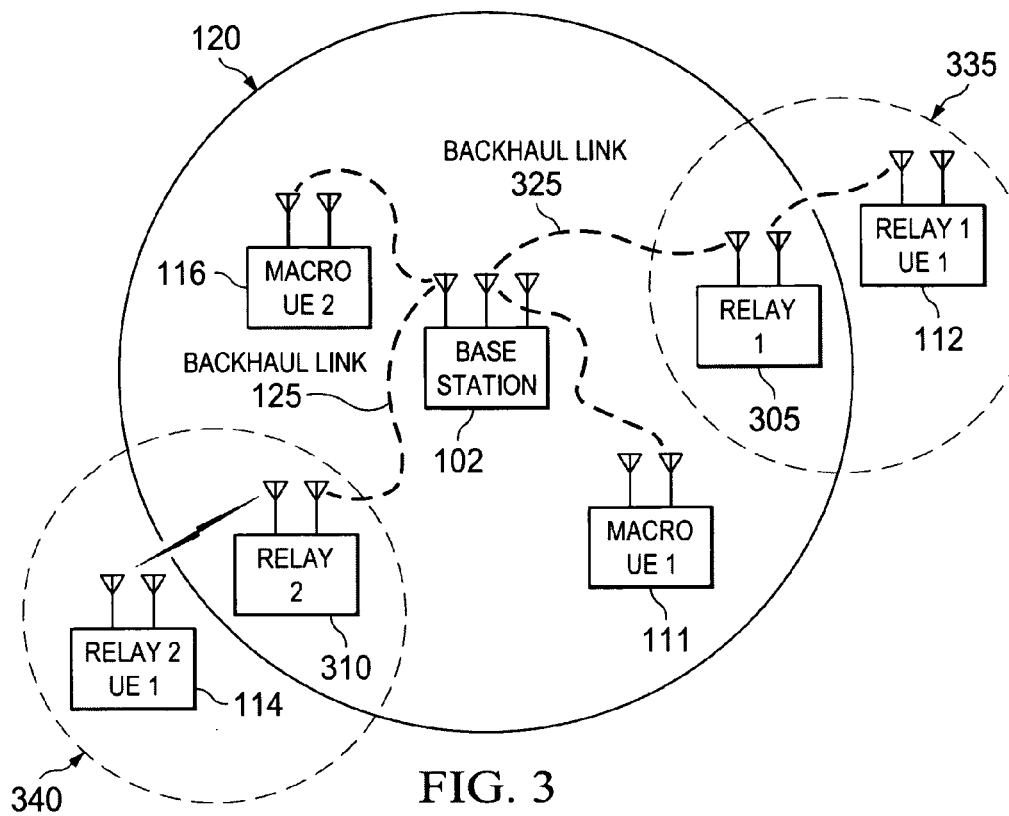
FIG. 3 illustrates a cellular system that includes relay stations according to the disclosure.

FIG. 3 illustrates a cellular system that includes relay stations according to the disclosure. Each relay station (RS) 305, 310 can include the same or similar components as BS 102 in cell 120. For the purpose of simplicity and clarity in explaining the operation of the present disclosure, the base transceiver subsystems in cell 335 and cell 340 and the relay station controller associated with the relay transceiver subsystems are collectively represented by RS 305 and RS 310 respectively.

BS 102 transmits and receives data from relays, RS 305 and RS 310, and macro subscriber stations (SS), SS 111 and SS 116. RS 305 transmits and receives data from SS 112 and RS 310 transmits and receives data from SS 114. SS 111, SS 112, SS 114 and SS 116 can be similarly situated UE's such that each includes the same or substantially similar communication functionality. However, each of SS 111, SS 112, SS 114 and SS 116 can be a different type of UE, such as a personal data assistant, personal computer, mobile telephone, smart phone, and the like.

The transmission link between BS 102 and each relay, such as RS 305 and RS 310, is referred herein as a backhaul link 325. RS 310 forwards the received data from BS 102 to SS 114 and RS 305 forwards the received data from BS 102 to SS 112. RS 310 also forwards received data from SS 114 to BS 102 and RS 305 also forwards received data from SS 112 to BS 102.

Relaying is used in an LTE-Advanced as a tool to improve items such as the coverage of high data rates, group mobility, temporary network deployment, the cell-edge throughput and/or to provide coverage in new areas. The relay node can be wirelessly connected to radio-access network and the connection can be in-band and out-band. For in-band relaying, the Evolved NodeB (eNodeB)-to-relay link operates in the same frequency spectrum as the relay-to-user equipment (UE) link. Due to the relay transmitter causing interference to its own receiver, simultaneous eNB-to-relay and relay-to-UE transmissions on the same frequency resource may not be feasible. One way to handle the interference problem is to operate the relay such that the relay is not transmitting to terminals when it is supposed to receive data from the donor eNB, that is, to create "gaps" in the relay-to-UE transmission. In the LTE system, these "gaps" can be created by configuring multicast/broadcast single frequency network (MBSFN) subframes as shown in FIG. 4.

Figure 4:
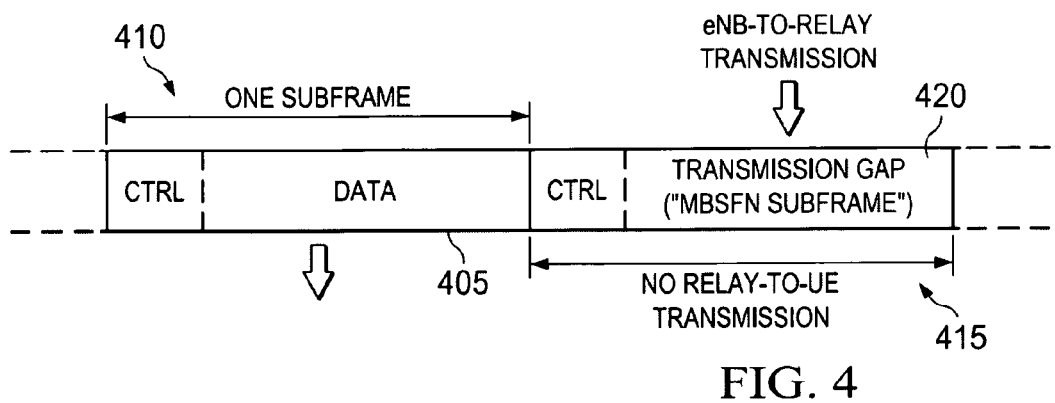
FIG. 4 illustrates a relay-to-SS communication using normal subframes and a BS-to-relay communication using MBSFN subframes according to the disclosure.

FIG. 4 illustrates a relay-to-SS communication using normal subframes and a BS-to-relay communication using MBSFN subframes according to this disclosure. The embodiment shown in FIG. 4 is for illustration only and other embodiments could be used without departing from the scope of this disclosure.

The relay, such as RS 305, transmits data 405 in first subframe 410 to SS 112. Then, in a subsequent subframe, that is the MBSFN subframe 415, RS 305 includes a transmission gap 420 to enable reception of a BS-to-relay transmission from BS 102.

The BS-to-relay communication occurs in the MBSFN subframe 415. SS 112 does not expect to receive any data 405 from RS 305 during the MBSFN subframe 415. However, RS 205 still sends control information to SS 112, which can occupy one or two symbols.

Figure 5A:
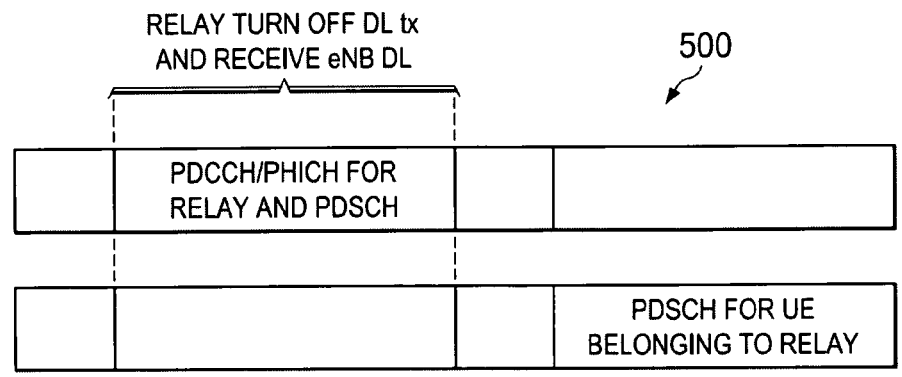
FIGS. 5A through 5B illustrate a subframe boundary between a BS to RS downlink transmission (BS-to-RS subframe) and an RS to SS downlink transmission (RS-to-SS subframe) according to embodiments of the present disclosure.
Figure 5B:
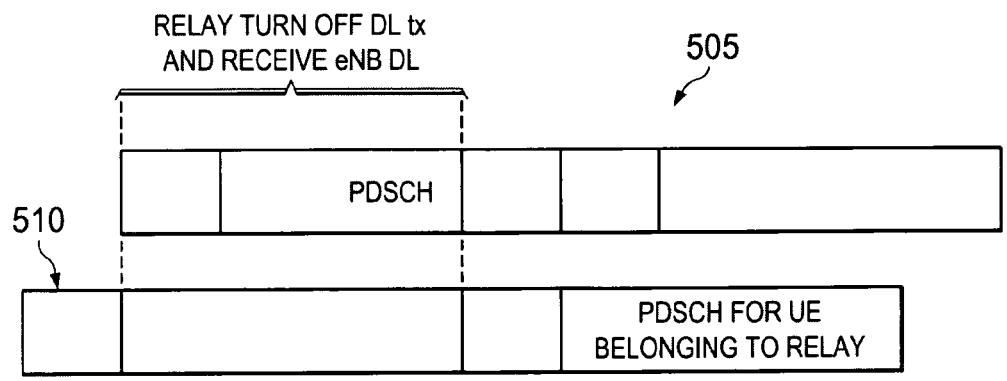

FIGS. 5A and 5B illustrate a subframe boundary between a BS to RS downlink transmission (BS-to-RS subframe) and an RS to SS downlink transmission (RS-to-SS subframe) according to embodiments of the present disclosure. The embodiment shown in FIGS. 5A and 5B are for illustration only and other embodiments could be used without departing from the scope of this disclosure.

As shown in the subframe structure 500 in FIG. 5A, the subframe boundary between BS-to-RS and an RS-to-SS is the same. However, the subframe structure 505 in FIG. 5B includes an offset 510 between BS-to-RS and an RS-to-SS. The offset 510 can be a two OFDM symbol offset plus the switching time from transmit mode to receive mode. RS 305 can receive an eNB PDCCH channel and a PHICH channel, but it will introduce large loss in the eNB PDSCH channel.

In some examples, transition periods exist from transmit (Tx) to receive (Rx) or from Rx to Tx. At most, a half symbol is used for the transition period. Therefore, a subframe boundary between BS-to-RS and an RS-to-SS for subframe structure 500 can include a half symbol offset.

In the LTE downlink, SS 112 knows how many symbols will be used for PDCCH channel by reading PCFICH channel from BS 102. In addition, the PCFICH channel normally is mapped to the first symbol of the subframe. However, for downlink backhaul subframe in subframe structure 500, RS 305 may not be able to read the PCFICH channel from BS 012 because RS 305 is transmitting data to SS112.

BS 102 will use a control channel R-PDCCH to transmit the control information to RS 305 and R-PDCCH will be transmitted in the PDSCH region of BS 102.

RS 305 may not know the size of eNB PDCCH region while it transmits control information to SS 112 in subframe structure 500.

In some embodiments, RS 305 assumes that BS 102 will use the maximum allowed number of symbols for its PDCCH channel transmission. In the LTE system, a number of OFDM symbols for PDCCH channel can be "1," "2" and "3" if the bandwidth is greater than ten Resource Blocks (RBs). The number of OFDM symbols will be "2," "3" and "4" if the bandwidth equals to or is less than 10 RBs.

For example, when the bandwidth is greater than 10 RBs. In addition, for ease and clarity of illustration, the embodiments described herein below will also apply to the case when the bandwidth is equal to or is less than 10 RBs. For this case, the maximum number of OFDM symbols allowed for BS PDCCH channel is "3" (four OFDM symbols when the bandwidth equals to or is less than 10 RBs). RS 305 assumes BS 102 uses three OFDM symbols for its PDCCH transmission regardless of how many OFDM symbols are actually used by BS 102 for its PDCCH channel transmission. The RS 305 will receive the data from BS 102 starting from the symbol #3 ($4^{th}$ symbol). (RS 305 will receive data from BS 102 starting from symbol #4 ($5^{th}$ symbol.) if the bandwidth is less than or equal to 10 RBs). The data region RS 305 receives from BS 102 may include R-PDCCH, R-PDSCH, or both. Because of transition period from Tx to Rx and from Rx to Tx, the subframe boundary of BS-to-RS and subframe boundary of RS-to-SS can include a half symbol offset in the subframe structure 500.

In some embodiments, RS 305 assumes that BS 102 will use the maximum allowed number of symbols for the bandwidth greater than 10 RBs for its PDCCH channel transmission. Regardless of the bandwidth size (that is, greater or less than 10 RBs), RS 305 will assume BS 102 will use three OFDM symbols for its PDCCH transmission and RS 305 will receive data from BS 102 starting from a fixed start point, such as the symbol #3 ($4^{th}$ symbol). BS 102 can still have variable number of OFDM symbols (less than or equal to 3) for its actual PDCCH control channel transmission. The data region RS 305 receives from BS 102 may include R-PDCCH, R-PDSCH, or both.

Figure 6:
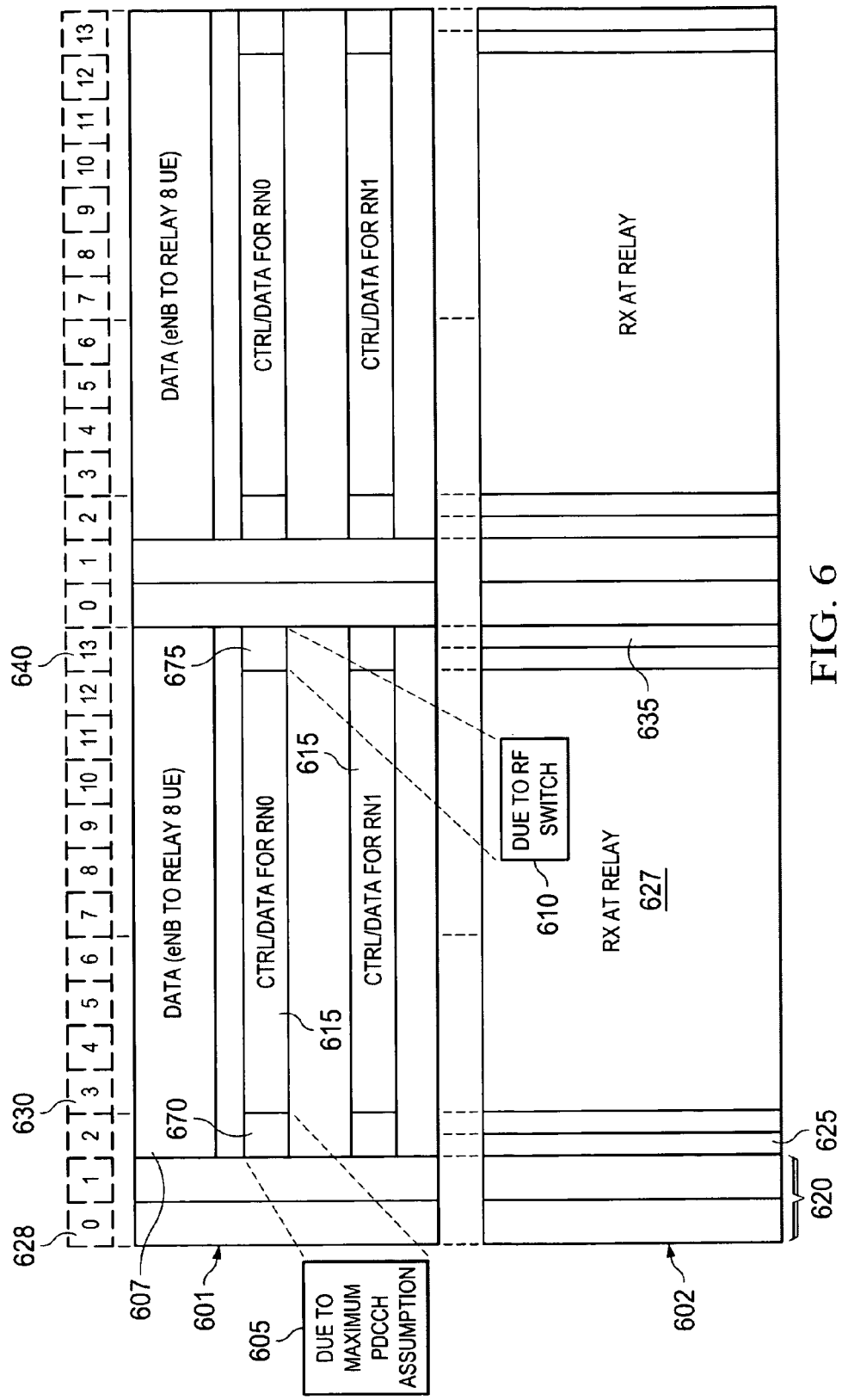
FIGS. 6 through 8 illustrate alignments for the subframe boundaries between BS-to-RS and RS-to-SS according to embodiments of the present disclosure.
Figure 7:
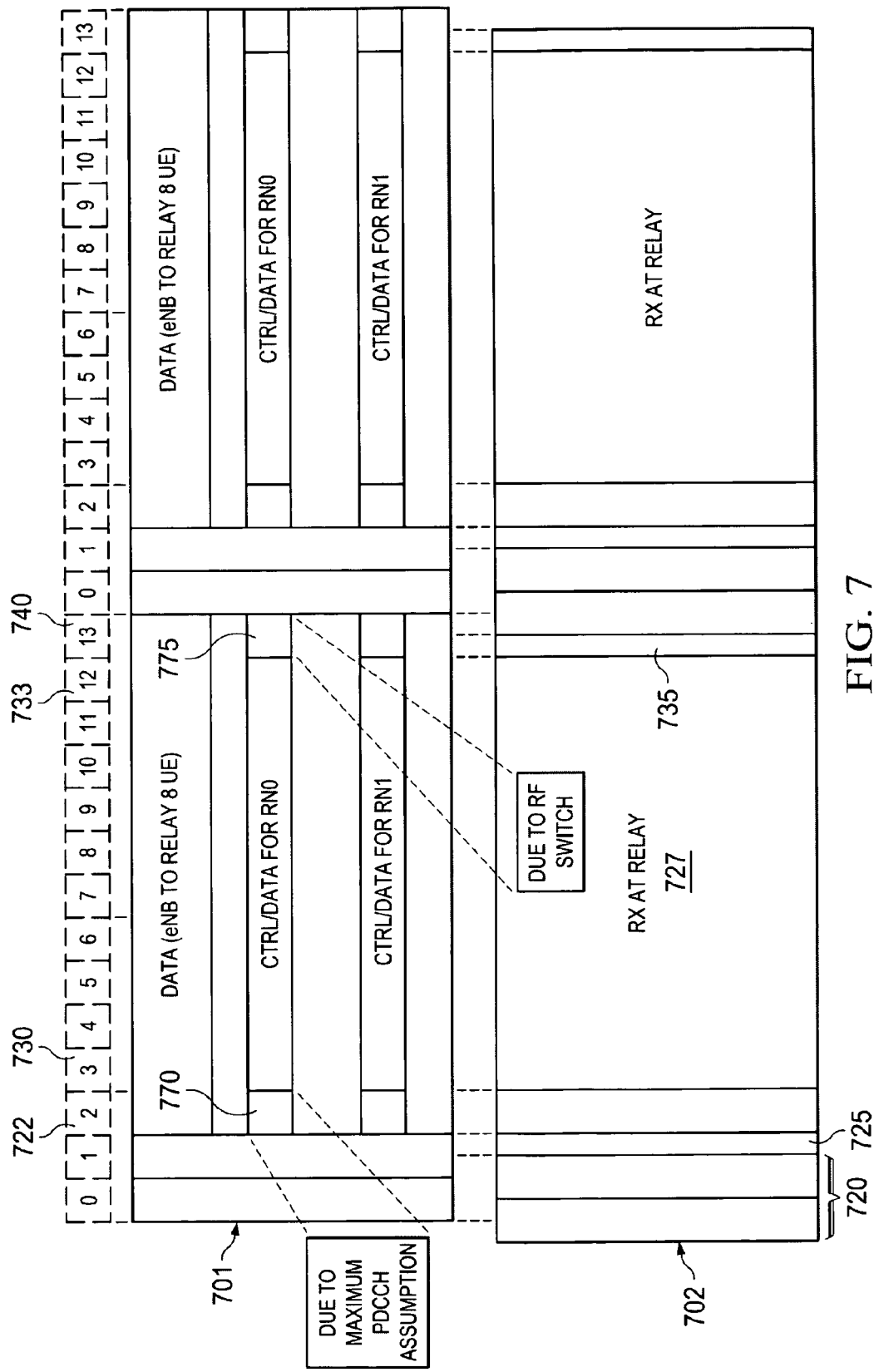
Figure 8:
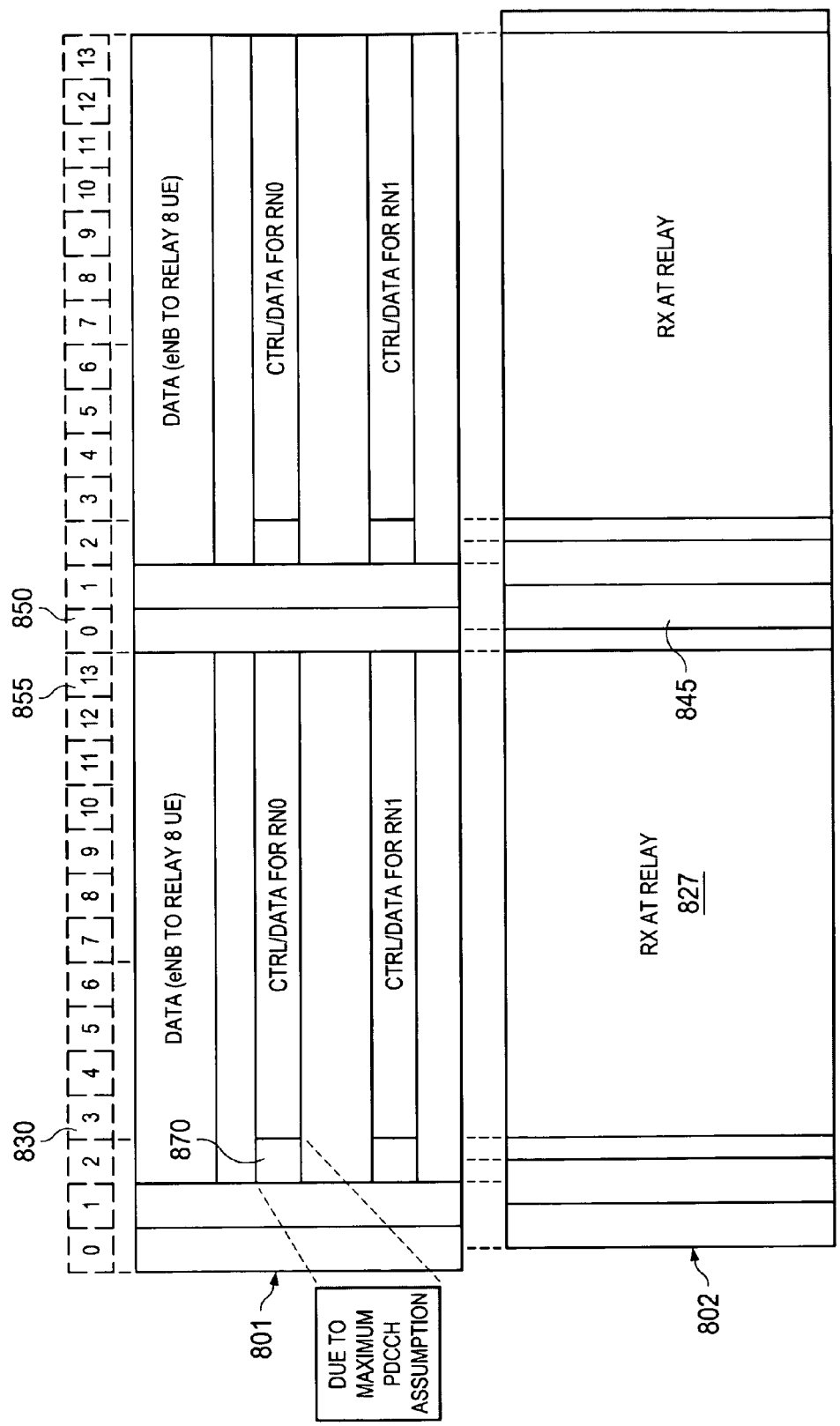

FIGS. 6 through 8 illustrate alignments for the subframe boundaries between BS-to-RS and RS-to-SS according to embodiments of the present disclosure. The embodiments shown in FIGS. 6 through 8 are for illustration only and other embodiments could be used without departing from the scope of this disclosure. In the examples shown in FIG. 6 through FIG. 8, BS 102 uses two OFDM symbols for its POOCH channel transmission while RS 305 will received the data from BS 102 started from symbol #3 ($4^{th}$ symbol).

FIG. 6 illustrates when the BS-to-RS subframe 601 is aligned to RS-to-SS subframe 602 boundary. Because of maximum PDCCH size assumption 605 and RN RX to TX transition 610, only relay transmit area 615 can be used for BS 102 to transmit control and data to RS 305 and RS 310. BS 102 also can transmit to one or more subscriber stations, such as SS 116, in SS transmit area 607. RS 305 transmits control information to SS 112 in the first two symbols 620. RS 305 switches 625 to a receive mode and starts to receive data from BS 102 in a receive area 627 commencing at the $4^{th}$ symbol (counted from symbol #628), which is symbol #3 630. The switching time from the transmit mode to the receive mode can be greater than a duration for the cyclic prefix (i.e., switching>cyclic prefix). RS 305 switches 635 to a transmit mode again at symbol #13 640. The switching time from the receive mode to the transmit mode can be greater than a duration for the cyclic prefix.

In some embodiments, the switching time from the transmit mode to the receive mode can be less than a duration for the cyclic prefix. That is, the switching occurs within the cyclic prefix. In addition, the switching time from the receive mode to the transmit mode can be less than a duration for the cyclic prefix.

FIG. 7 illustrates when the BS-to-RS subframe 701 is offset from the RS-to-SS subframe 702 boundary by a half symbol shift ahead (e.g., to the left). Similar to the alignment example in FIG. 6, RS 305 transmits to SS 112 during the first two symbols 705. RS 305 switches 725 to receive data a half symbol prior to the $3^{rd}$ symbol, symbol #2 722. Then RS 305 can receive data from BS 102 in receive area 727 starting from $4^{th}$ symbol, symbol #3 730, through the $11^{th}$ symbol, symbol

12 733. RS 305 switches 735 to transmit data to SS 112 again a half symbol ahead of the BS-to-RS subframe.

FIG. 8 illustrates when the RS-to-SS subframe 802 boundary is half symbol shift behind (e.g., to the right) the BS-to-RS subframe 801. RS 305 receives 827 BS 102 data commending at the $3^{rd}$ symbol 830 and transmit control information 845 to SS 112 in the next subframe symbol #850.

In some embodiments, the end of symbols in which RS 305 can receive the data from BS 102 will be based on the offset between the RS-to-SS subframe 802 boundary and the BS-to-RS subframe 801 boundary and the assumption of number of OFDM symbols used for BS 102 PDCCH transmission.

In this example shown in FIG. 8, the RS-to-SS subframe 802 boundary is shifted a half symbol behind (e.g., to the right) the BS-to-RS subframe 801 boundary. RS 305 assumes BS 102 will use three OFDM symbols for its PDCCH transmission. RS 305 receives data from BS 102 until the symbol #13 855, which is the $14^{th}$ symbol. Therefore, symbol #13 855 is the end of the subframe.

In some embodiments, RS 305 receives the start symbol number where BS 102 will send control and data from BS 102 via higher layer signaling. This signaling can be sent to RS 305 dynamically or semi-statically. In dynamic signaling, BS 102 sends the PDCCH size to RS 305 every frame or every several subframes.

In some embodiments, RS 305 receives the end symbol number where BS 102 will send control and data from BS 102 via higher layer signaling. This signaling can be sent to RS 305 dynamically or semi-statically. In dynamic signaling, BS 102 sends the PDCCH size to RS 305 every frame or every several subframes.

In the examples shown in FIG. 6 through FIG. 8, BS 102 signals the RS 305 that it will use three OFDM symbols for its PDCCH channel transmission through higher layer signaling. The R-PDCCH will start from the $4^{th}$ symbol, symbol #3 630, 730 and 830 respectively. BS 102 can still have variable number of OFDM symbols (less than or equal to 3 in this example) for its PDCCH channel transmission. A gap 670, 770, 870 results from the indication of the start symbol. The gap 670, 770, 870 can be due to higher layer signaling and RF switch. Further, an end gap 675, 775 results from the indication of the end symbol. The end gap 675, 775 can result from an assumption or can be due to higher layer signaling and RF switch.

Figure 9:
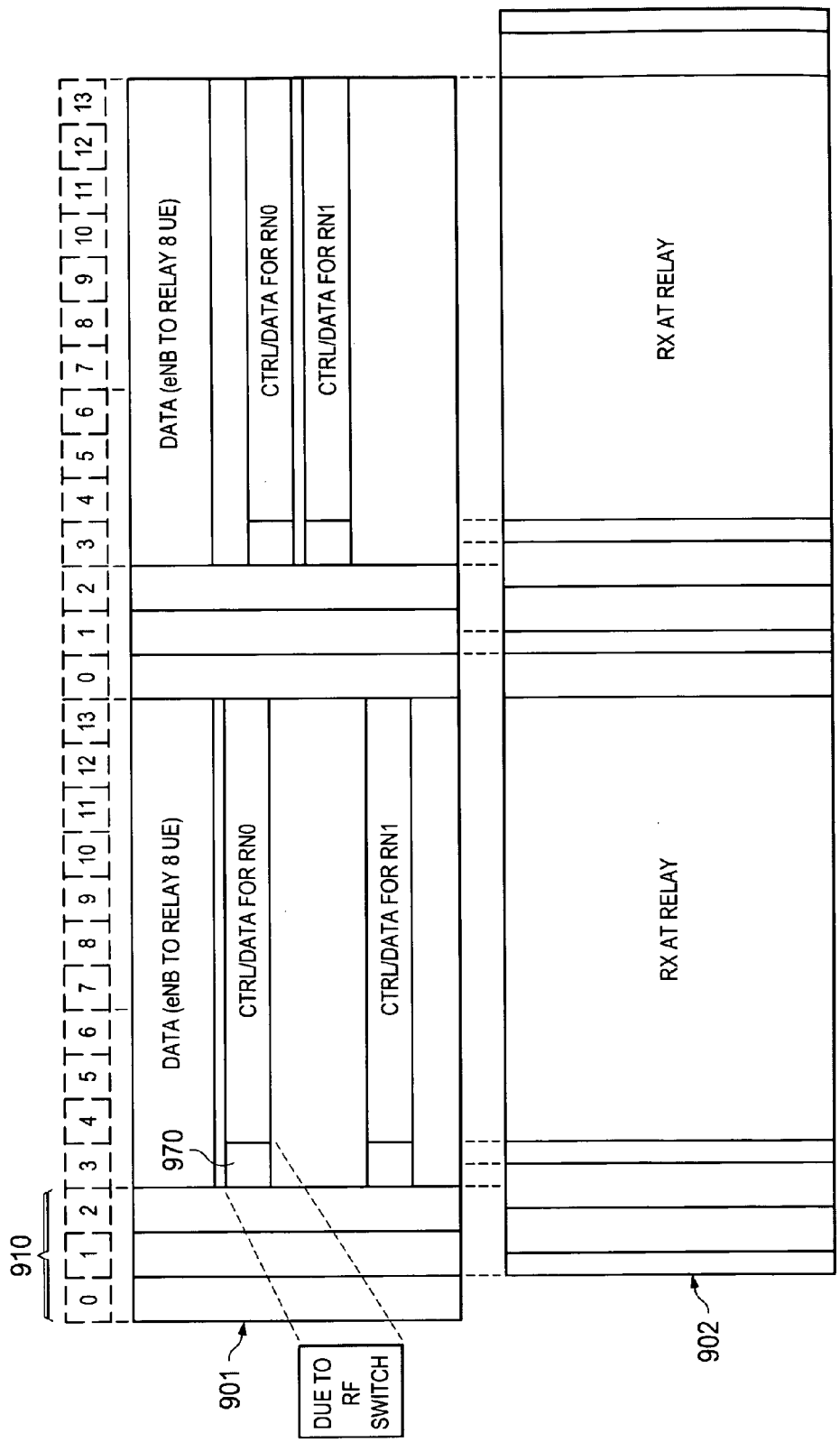
FIGS. 9 through 10 illustrate an RS-to-SS subframe boundary offset by one symbol with respect to BS-to-RS subframe according to embodiments of the present disclosure.
Figure 10:
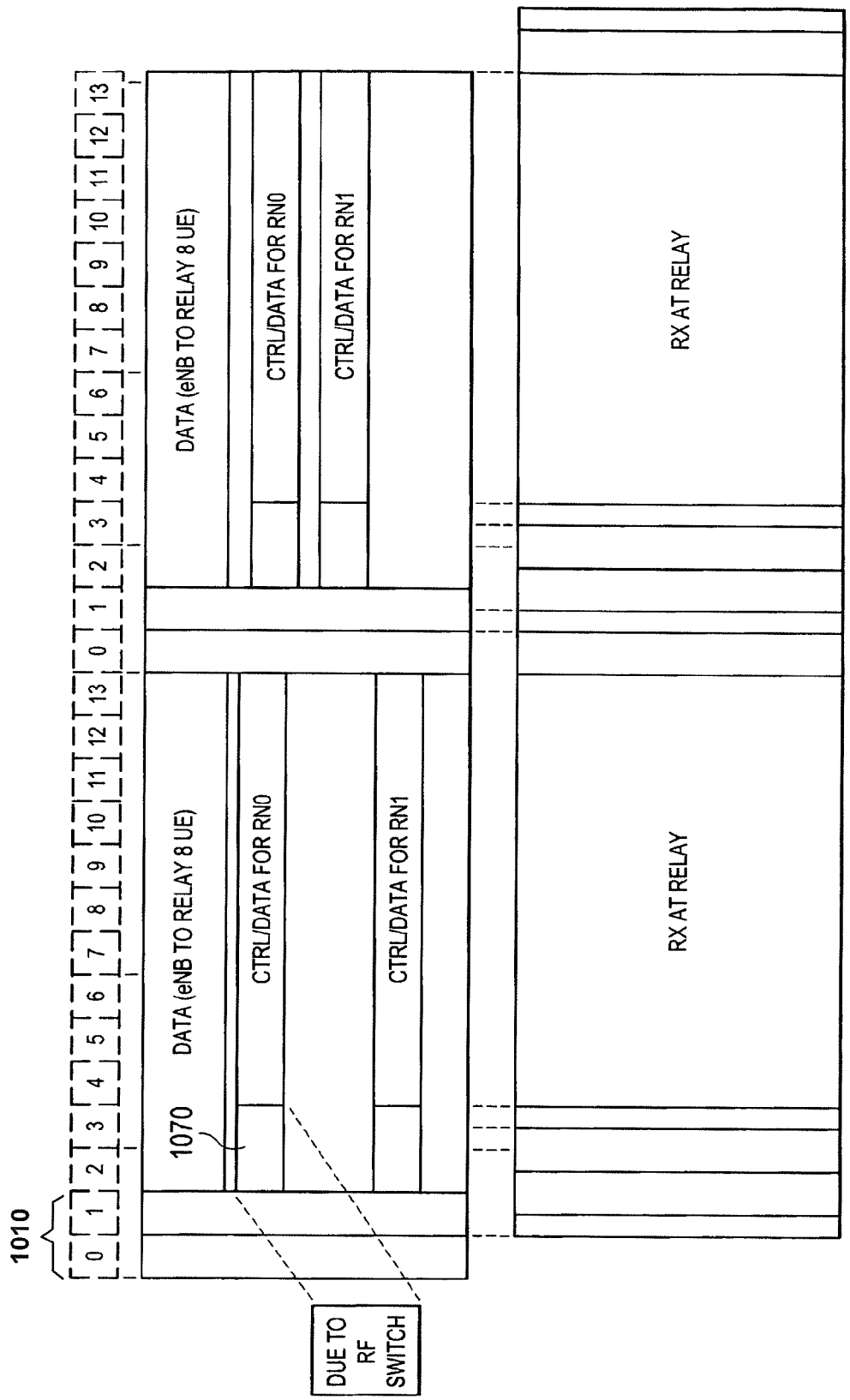

In addition, as shown in the examples illustrated in FIGS. 9 and 10, discussed herein below, the gap 970, 1070 can vary in size as a result of the offset shift and number of symbols used by BS 102 for its PDCCH channel transmission. The RS-to-SS subframe 902 boundary is shifted one symbol behind (e.g., to the right) the BS-to-RS subframe 901. Since the BS PDCCH size is indicated in the PCFICH and the PCFICH is mapped to the first OFDM symbol of BS 102's control region, RS 305 can read BS 102's PCFICH to determine BS 102's PDCCH size. Examples with different PDCCH sizes are shown in FIGS. 9 and 10. In FIG. 9, BS 103 uses three symbols 910 for the PDCCH channel transmission. In FIG. 10, BS 103 uses two symbols 1010 for the PDCCH channel transmission.

Figure 11:
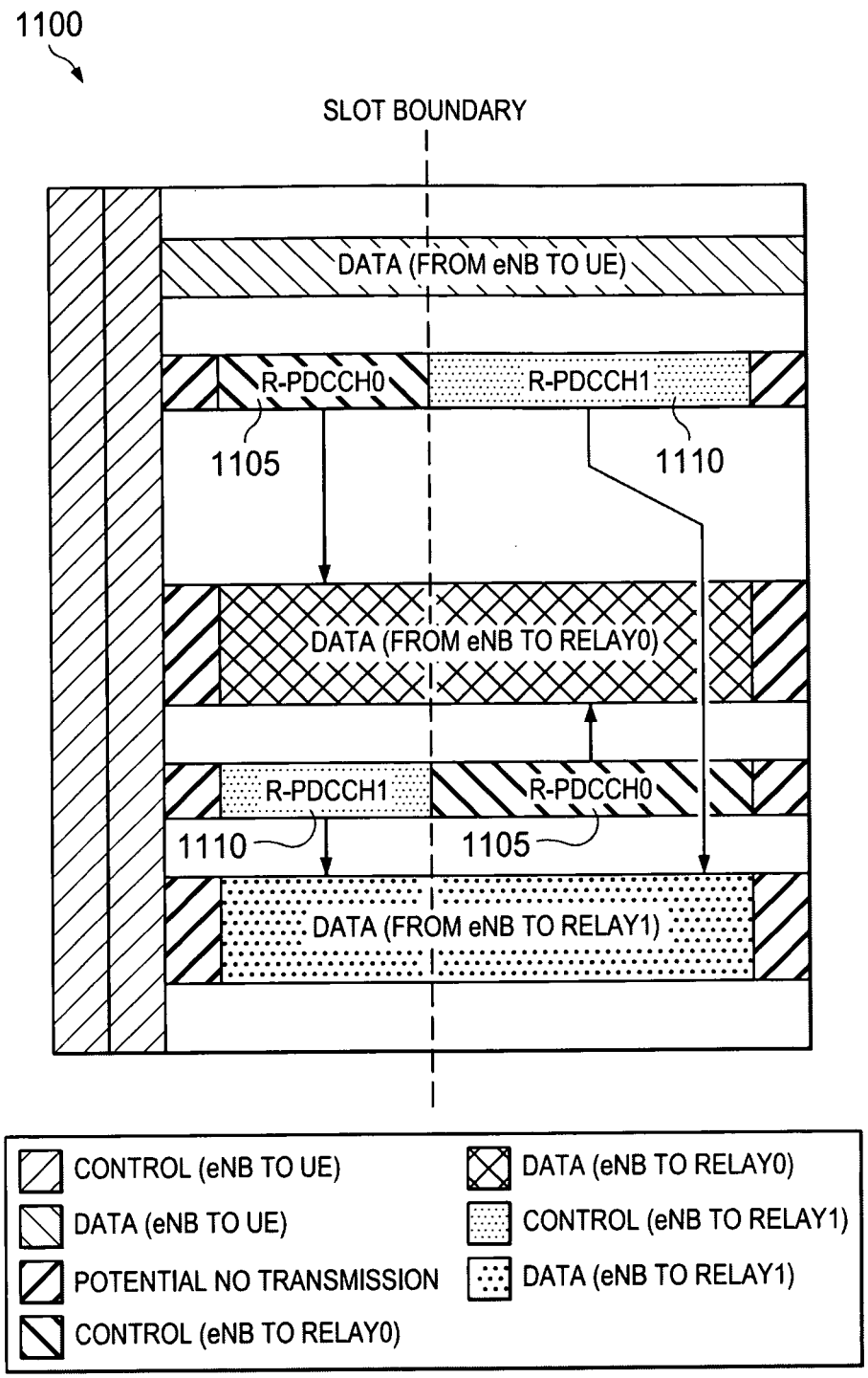
FIG. 11 illustrates a distributed resource block according to embodiments of the present disclosure.

FIG. 11 illustrates a distributed resource block according to embodiments of the present disclosure. The distributed resource block shown in FIG. 11 is for illustration only. Other embodiments could be used without departing from the scope of this disclosure.

In some embodiments, a new control channel design for downlink backhaul link is utilized. As illustrated herein above, RS 305 may not get the control information from BS 102 by reading the BS PDCCH channel in subframe structure 500. The new control channel design (R-PDCCH) 1100 can be used for BS 102 to send control information to RS 305. The R-PDCCH channel can be sent to indicate the BS-to-RS DL or UL backhaul information.

The R-PDCCH channel can be mapped to one RB. The size of this RB can be equal to the size of one normal RB less the "no transmission" part. In addition, the R-PDCCH channel can be mapped to multiple RBs depending upon on the R-PDCCH size. For example, if the R-PDCCH size is small, one RB can be used to carry multiple R-PDCCHs. The small R-PDCCHs can be multiplexed to one "RB" using Time Division Multiplexing (TDM), Code Division Multiplexing (CDM) or mixed TDM/CDM.

The RBs can be localized or distributed. Localized RBs can use all the available symbols in a sub-band. Distributed RBs can hop, for example at the slot boundary of a subframe, from one sub-band to another sub-band.

For example, one distributed RB with a FIG. 5A type alignment is shown in FIG. 11. The R-PDCCH location 1105, 1110 is pre-determined and sent to RS 305 beforehand either by BS higher layer signaling or from BS 102's broadcast channel. RS 305 and RS 310 can each monitor the pre-determined RBs to obtain their respective control information, such as the region to relay data from BS-to-RS, and so forth.

Figure 12:
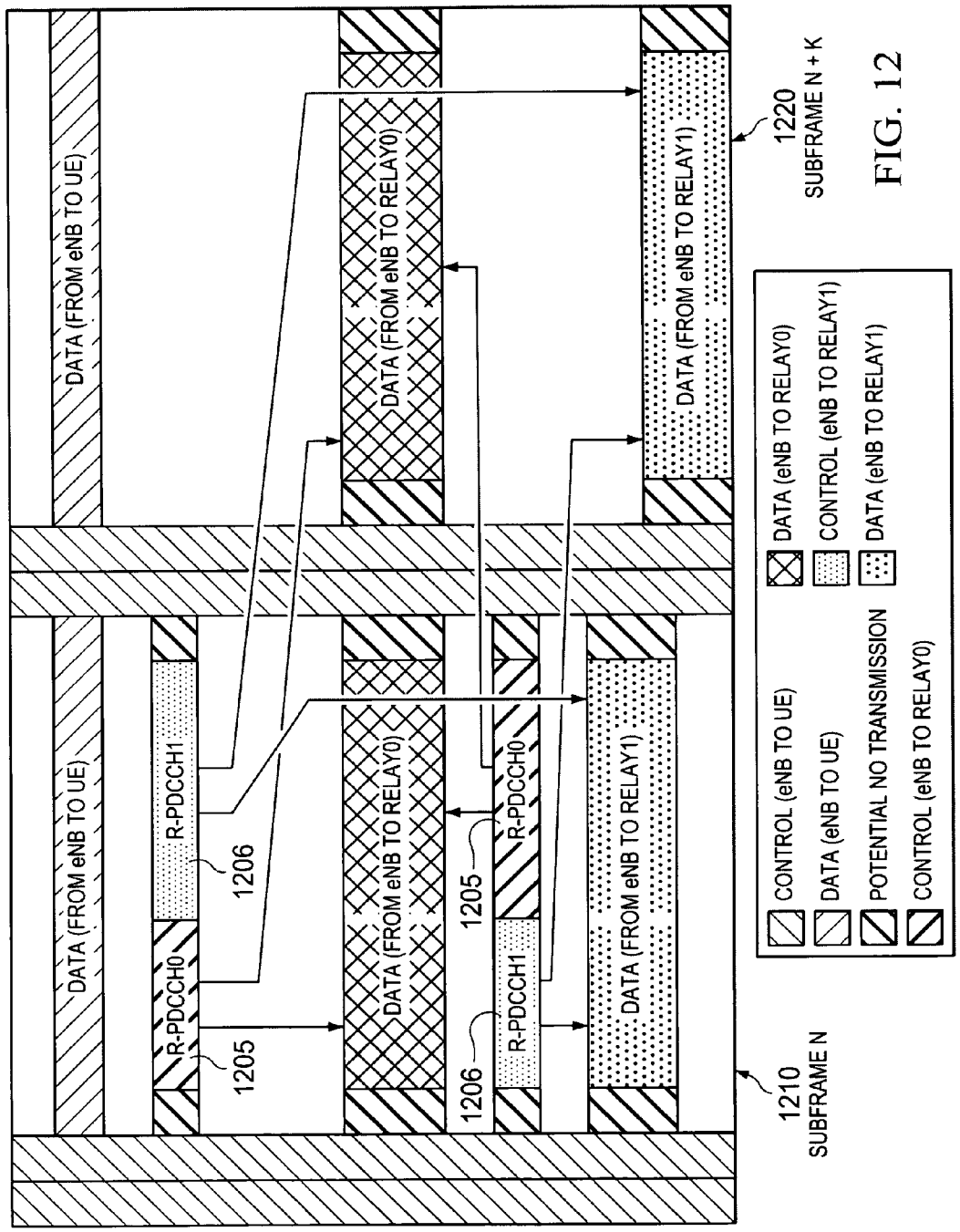
FIG. 12 illustrates downlink backhaul transmissions according to embodiments of the present disclosure.

FIG. 12 illustrates downlink backhaul transmissions according to embodiments of the present disclosure. The DL backhaul transmissions shown in FIG. 12 are for illustration only. Other embodiments could be used without departing from the scope of this disclosure.

In some embodiments, one backhaul Scheduling Allocation (SA) can be used to indicate multiple resource allocation for backhaul data in several subframes. The indication of resource allocation can be either fixed or vary across the subframes.

For the backhaul relay system, DL SA for R-PDSCH in subframe n can be used to indicate data in subframe n, DL SA for R-PDSCH in subframe n+k, and so forth (where k>0 is an integer) can be transmitted together in subframe n. Each SA can be mapped to one R-PDCCH and all R-PDCCHs will be transmitted in subframe n; or all SAs can be mapped to one R-PDCCH and the R-PDCCH will be transmitted in subframe n. Each SA has different timing offset relative to the SA lives (subframe n). Furthermore, these SAs can be jointly coded.

UL SA for UL resource in subframe n+4, UL SA for UL resource in subframe n+4+k, . . . , and so forth can be transmitted together in subframe n. Each SA can be mapped to one R-PDCCH and all R-PDCCHs will be transmitted in subframe n; or all SAs can be mapped to one R-PDCCH and the R-PDCCH will be transmitted in subframe n. Each SA has different timing offset relative to the SA lives (subframe n). Furthermore, these SAs can be jointly coded.

In FIG. 12, one DL SA 1205 is used to indicate resource in two subframes 1210, 1220. In this example, both R-PDCCH0 1205 and R-PDCCH1 1206 include resource allocations for both subframe n 1210 and subframe n+k 1220. For the example, for R-PDCCH0 1205, the resource allocations (indicated by DL SA at subframe n 1210) do not change from subframe n 1210 to subframe n+k 1220. Only one grant is needed and it will be transmitted in R-PDCCH0 in subframe 1210. In the grant, it may have the information to let RS 305 know it indicates both subframe 1210 and 1220. Whereas for R-PDCCH1 1206, the resource allocation changes (indicated by DL SA in subframe n+k 1220) can vary from subframe n 1210 to subframe n+k 1220. Two grants are needed and they will be transmitted in R-PDCCH1 in subframe 1210. Each grant will have the different timing offset relative to the grant lives (subframe 1210).

In some embodiments, separate coding can be used for control information such as the uplink SA, downlink SA, and HARQ Indictor (HI), which are transmitted from the BS 102 to RS 305. The separately coded control information are then multiplexed together and transmitted on the R-PDCCH channels described above.

Figure 13A:
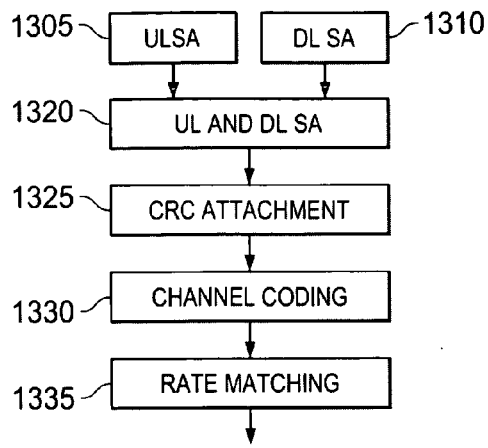
FIGS. 13A through 13B illustrate joint coding for UL/DL scheduling assignments according to embodiments of the present disclosure.
Figure 13B:
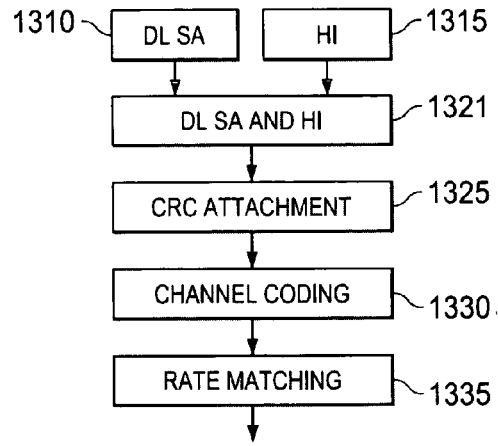

FIGS. 13A through 13B illustrate joint coding for UL/DL scheduling assignments according to embodiments of the present disclosure. FIG. 13A shows joint coding for UL/DL scheduling assignments while FIG. 13B shows illustrate joint coding for DL scheduling assignments and HARQ indicators. The joint coding shown in FIGS. 13A and 13B are for illustration only. Other embodiments could be used without departing from the scope of this disclosure.

In some embodiments, joint coding can be used for control information like uplink SA 1305, downlink SA 1310, HARQ Indictor (HI) 1315, which are transmitted from BS 102 to RS 305. The jointly coded control information is then carried on the R-PDCCH channels described above. In BS-to-RS backhaul system, channel quality will not change significantly once RS 305 is deployed. In addition, uplink SA 1305 and downlink SA 1310 can be jointly coded to more efficiently use the R-PDCCH resource. Furthermore, HI 1315 can also be jointly coded with DL SA 1310.

Instead of coding UL SA and DL SA separately and using two separated coding chains, in FIG. 13A, UL SA 1305 and DL SA 1310 are first combined in block 1320. Only one CRC is attached in block 1325 to the combined SA. One channel coding 1330 and rate matching 1335 is used for joint coding. In FIG. 13B combine DL SA 1310 and HI 1315 together in block 1321. Only one coding chain is used. Because of joint coding, some of the occupied resources for separated coding can be used for some other purpose now. For example, Part of the PHICH channel previously used by relay node HARQ indicator could be used. In some embodiments, the DL SA 1310, UL SA 1305 and HI 1315 together.

In some embodiments, for subframe structure 505, a predetermined set of CCEs backhaul downlink relay control information are used. The size and indices for the set of CCEs used for the backhaul relay control can be dependent on the PCFICH value indicated by BS 102 in the subframe in which the relay control channel is transmitted. This dependence of CCE set on PCFICH value can be fixed in the specification or signaled to RS 305 via higher layer signaling. For example, if PCFICH=1, then the CCEs {1, 2} are used, if PCFICH=2, then the CCEs {3, 4, 5, 6} are used for the relay control channel. In addition, the joint coding of DL SA 1310, UL SA 1305 and HI 1315 discussed above can be also applicable in subframe structure 505.

In the LTE Rel-8 system, which indicates the number of OFDM symbols used for control signaling at the beginning of the subframe, control information is transmitted on an aggregated of one or several Control Channel Elements (CCEs). A subscriber station detects the control information by blindly searching the control channel candidates until it finds its own control channel. By pre-determined CCEs for relay control channel and restrict the search to certain CCE aggregation levels, the number of blind detection can be reduced.

Figure 14:
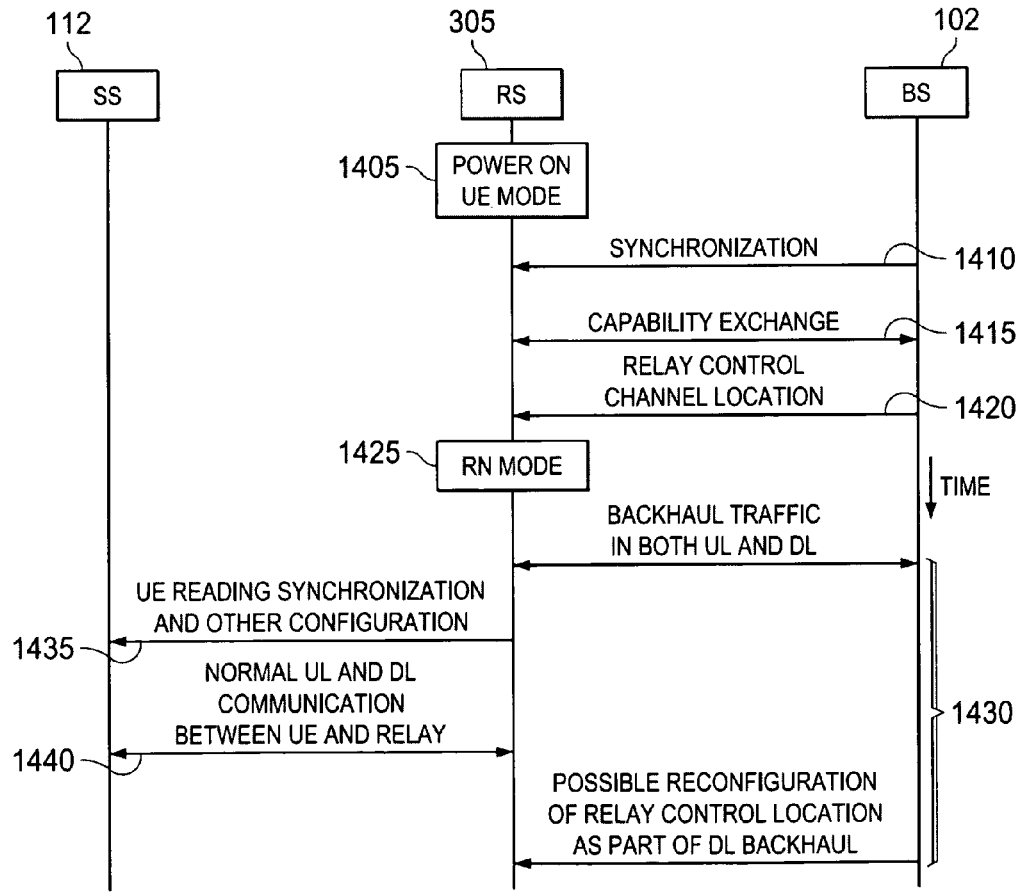
FIG. 14 illustrates a relay operation according to embodiments of the present disclosure.

FIG. 14 illustrates a relay operation according to embodiments of the present disclosure. The relay operation shown in FIG. 14 is for illustration only. Other embodiments could be used without departing from the scope of this disclosure.

RS 305 powers on in block 1405. When RS 205 is powered on and joins the network the first time, RS 305 performs actions similar to a subscriber station. RS 305 synchronizes 1410 with BS 102. RS 305 uses a synchronization procedure similar to the subscriber station in order to synchronize with BS 102. After RS 305 is synchronized with BS 102, RS 305 and BS 102 exchange capability information 1415. RS 305 reads BS 102's information through BS 102's broadcast channel to determine the predetermined Relay control channel location 1420 to read its control channel (as described above for subframe structure 500 and subframe structure 505). After RS 305 receives the required information from BS 102, in block 1425 RS 305 switches from "UE mode" to "relay mode," that is, to serve SS 112 and other subscriber stations in RS 305's coverage area. From then on, BS 102 can adjust the location of the relay control channel by sending proper signaling as a part of the backhaul traffic 1430. In addition, SS 112 can read synchronization and configured information 1435 to establish communications 1440 with RS 305.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of receiving control information from a base station by a relay station in a communication system, the method comprising:

receiving symbol information of a downlink subframe through which downlink control information for the relay station is received;

receiving the downlink control information for the relay station according to the symbol information, wherein the downlink subframe includes a first slot and a second slot and the symbol information includes a location within the first slot of a starting symbol at which the downlink control information in the first slot begins and a location within the second slot of an ending symbol at which the downlink control information in the second slot terminates, wherein the location of the ending symbol within the second slot is based upon whether subframe boundaries of the base station and the relay station are aligned with each other, and wherein the location of the ending symbol is a seventh symbol of the second slot when the subframe boundaries of the base station and the relay station are not aligned with each other.

2. The method of claim 1, wherein the location of the starting symbol is a fourth symbol of the first slot.

3. The method of claim 1, wherein the location of the ending symbol is a sixth symbol of the second slot when the subframe boundaries of the base station and the relay station are aligned with each other.

4. The method of claim 1, wherein the downlink control information for the relay station is received through a relay physical downlink control channel (R-PDCCH).

5. The method of one of claim 1, wherein the downlink subframe comprises a multicast/broadcast single frequency network (MBSFN) subframe.

6. A method of receiving control information from a base station by a relay station in a communication system, the method comprising:

receiving symbol information of a downlink subframe through which downlink control information for the relay station is received;

receiving the downlink control information for the relay station according to the symbol information, wherein the downlink subframe includes a first slot and a second slot and the symbol information includes a location within the first slot of a first symbol at which receiving of the downlink control information begins and a location within the second slot of a second symbol at which receiving of the downlink control information terminates, and wherein the second symbol is a sixth symbol of the second slot when subframe boundaries of the base station and the relay station are aligned to each other, and is a seventh symbol of the second slot when the subframe boundaries of the base station and the relay station are not aligned to each other.

7. The method of claim 6, further comprising:
transmitting downlink control information for a mobile station to the mobile station by the relay station in the downlink subframe,
wherein the downlink control information for the mobile station is transmitted during first to third symbols of the first slot.

8. The method of claim 7, wherein the location of the first symbol is determined by a system bandwidth and the system bandwidth is larger than 10 resource blocks.

9. A relay station configured to receive control information from a base station in a communication system, the relay station comprising:
one or more antennas configured to transmit and receive downlink control information; and
a controller coupled to the one or more antennas, the controller configured to receive symbol information of a downlink subframe through which downlink control information for the relay station is received and to receive the downlink control information for the relay station according to the symbol information,
wherein the downlink subframe includes a first slot and a second slot and the symbol information includes a location within the first slot of a starting symbol at which the downlink control information for the relay station within the first slot begins and a location of an ending symbol at which the downlink control information for the relay station within the second slot terminates,
wherein the location of the ending symbol within the second slot is based upon whether subframe boundaries of the base station and the relay station are aligned with each other, and
wherein the location of the ending symbol is a seventh symbol of the second slot when the subframe boundaries of the base station and the relay station are not aligned with each other.

10. The relay station of claim 9, wherein the location of the starting symbol is a fourth symbol of the first slot.

11. The relay station of claim 9, wherein the location of the ending symbol is a sixth symbol of the second slot when the subframe boundaries of the base station and the relay station are aligned with each other.

12. The relay station of claim 9, wherein the downlink control information for the relay station is received through a relay physical downlink control channel (R-PDCCH) at a predetermined symbol of the downlink subframe.

13. The relay station of claim 9, wherein the downlink subframe comprises a multicast/broadcast single frequency network (MBSFN) subframe.

14. A relay station configured to receive control information from a base station in a communication system, the relay station comprising:
one or more antennas configured to transmit and receive downlink control information; and
a controller coupled to the one or more antennas, the controller configured to control transmission and reception of the downlink control information,
wherein the controller is configured to receive symbol information of a downlink subframe through which downlink control information for the relay station is received and to receive the downlink control information for the relay station according to the symbol information,
wherein the downlink subframe includes a first slot and a second slot and the symbol information includes a location of a first symbol of the first slot at which receiving of the downlink control information begins and a location of a second symbol of the second slot at which receiving of the downlink control information terminates, and
wherein the second symbol is a sixth symbol of the second slot when subframe boundaries of the base station and the relay station are aligned to each other, and is a seventh symbol of the second slot when the subframe boundaries of the base station and the relay station are not aligned to each other.

15. The relay station of claim 14, wherein the controller is configured to control the relay station to transmit downlink control information for a mobile station to the mobile station in the downlink subframe,
wherein the downlink control information for the mobile station is transmitted during first to third symbols of the first slot.

16. The relay station of claim 15, wherein the location of the first symbol is determined by a system bandwidth and the system bandwidth is larger than 10 resource blocks.

17. A method of transmitting control information to a relay station by a base station in a communication system, the method comprising:
transmitting symbol location information of a downlink subframe through which downlink control information for the relay station will be transmitted;
transmitting the downlink control information for the relay station according to the symbol location information,
wherein the downlink subframe includes a first slot and a second slot and the symbol location information includes a location within the first slot of a starting symbol at which the downlink control information in the first slot begins and a location within the second slot of an ending symbol at which the downlink control information in the second slot terminates,
wherein the location of the ending symbol within the second slot is based upon whether subframe boundaries of the base station and the relay station are aligned with each other, and
wherein the location of the ending symbol is a seventh symbol of the second slot when the subframe boundaries of the base station and the relay station are not aligned with each other.

18. The method of claim 17, wherein the location of the starting symbol is a fourth symbol of the first slot.

19. The method of claim 17, wherein the location of the ending symbol is a sixth symbol of the second slot when the subframe boundaries of the base station and the relay station are aligned with each other.

20. The method of claim 17, wherein the downlink control information for the relay station is received through a relay physical downlink control channel (R-PDCCH).

21. The method of claim 20, wherein the downlink subframe comprises a multicast/broadcast single frequency network (MBSFN) subframe.

22. A method of transmitting control information to a relay station by a base station in a communication system, the method comprising:
- transmitting symbol location information of a downlink subframe through which downlink control information for the relay station will be transmitted;
- transmitting the downlink control information for the relay station according to the symbol location information,
- wherein the downlink subframe includes a first slot and a second slot and the symbol location information includes a location of a first symbol of the first slot at which receiving of the downlink control information begins and a location of a second symbol of the second slot at which receiving of the downlink control information terminates, and
- wherein the second symbol is a sixth symbol of the second slot when subframe boundaries of the base station and the relay station are aligned to each other, and is a seventh symbol of the second slot when the subframe boundaries of the base station and the relay station are not aligned to each other.

23. The method of claim 22, wherein the location of the first symbol is determined by a system bandwidth and the system bandwidth is larger than 10 resource blocks.

24. A base station configured to transmit control information to a relay station in a communication system, the base station comprising:
- a controller configured to determine symbol location information of a downlink subframe through which downlink control information for the relay station will be transmitted; and
- a transmitter configured to transmit the symbol location information to the relay station and to transmit the downlink control information for the relay station according to the symbol location information,
- wherein the downlink subframe includes a first slot and a second slot and the symbol location information includes a location within the first slot of a starting symbol at which the downlink control information in the first slot begins and a location within the second slot of an ending symbol at which the downlink control information in the second slot terminates,
- wherein the location of the ending symbol within the second slot is based upon whether subframe boundaries of the base station and the relay station are aligned with each other, and
- wherein the location of the ending symbol is a seventh symbol of the second slot when the subframe boundaries of the base station and the relay station are not aligned with each other.

25. The base station of claim 24, wherein the location of the starting symbol is a fourth symbol of the first slot.

26. The base station of claim 24, wherein the location of the ending symbol is a sixth symbol of the second slot when the subframe boundaries of the base station and the relay station are aligned with each other.

27. The relay station of claim 24, wherein the transmitter is configured to transmit the downlink control information for the relay station through a relay physical downlink control channel (R-PDCCH).

28. The relay station of claim 24, wherein the downlink subframe comprises a multicast/broadcast single frequency network (MBSFN) subframe.

29. A base station configured to transmit control information to a relay station in a communication system, the base station comprising:
- a controller configured to determine symbol location information of a downlink subframe through which downlink control information for the relay station will be transmitted; and
- a transmitter configured to transmit the symbol location information to the relay station and to transmit the downlink control information for the relay station according to the symbol location information,
- wherein the downlink subframe includes a first slot and a second slot and the symbol location information includes a location of a first symbol of the first slot at which receiving of the downlink control information begins and a location of a second symbol of the second slot at which receiving of the downlink control information terminates, and
- wherein the second symbol is the sixth symbol of the second slot when subframe boundaries of the base station and the relay station are aligned to each other, and is the seventh symbol of the second slot when subframe boundaries of the base station and the relay station are not aligned to each other.

30. The base station of claim 29, wherein the location of the first symbol is determined by a system bandwidth and the system bandwidth is larger than 10 resource blocks.

31. A communication system, comprising:
- at least one base station; and
- at least one relay station configured to relay communication between the at least one base station and a plurality of mobile stations,
- wherein the relay station includes one or more antennas configured to transmit and receive data and downlink control information, and a controller coupled to the one or more antennas is configured to control transmission and reception of the downlink control information,
- wherein the controller is configured to receive symbol information of a downlink subframe through which downlink control information for the relay station is received and to receive the downlink control information for the relay station according to the symbol information, and
- wherein the downlink subframe includes a first slot and a second slot and the symbol information includes a location within the first slot of a starting symbol at which the downlink control information in the first slot begins and a location within the second slot of an ending symbol at which the downlink control information in the second slot terminates,
- wherein the location of the ending symbol within the second slot is based upon whether subframe boundaries of the base station and the relay station are aligned with each other, and
- wherein the location of the ending symbol is a seventh symbol of the second slot when the subframe boundaries of the base station and the relay station are not aligned with each other.

32. The communication system of claim 31, wherein the location of the starting symbol is a fourth symbol of the first slot.

33. The communication system of claim 31, wherein the location of the ending symbol is a sixth symbol of the second slot when the subframe boundaries of the base station and the relay station are aligned with each other.

34. The communication system of claim 33, wherein the downlink control information for the relay station is received through a relay physical downlink control channel (R-PDCCH).

35. The communication system of claim 31, wherein the downlink subframe comprises a multicast/broadcast single frequency network (MBSFN) subframe.

36. A communication system, comprising:
at least one base station; and
at least one relay station configured to relay communication between the at least one base station and a plurality of mobile stations,
wherein the relay station includes one or more antennas configured to transmit and receive data and downlink control information, and a controller coupled to the one or more antennas is configured to control transmission and reception of the downlink control information,
wherein the controller is configured to receive symbol information of a downlink subframe through which downlink control information for the relay station is received and to receive the downlink control information for the relay station according to the symbol information,
wherein the downlink subframe includes a first slot and a second slot and the symbol information includes a location of a first symbol of the first slot at which receiving of the downlink control information begins and a location of a second symbol of the second slot at which receiving of the downlink control information terminates, and
wherein the second symbol is the sixth symbol of the second slot when subframe boundaries of the base station and the relay station are aligned to each other, and is the seventh symbol of the second slot when the subframe boundaries of the base station and the relay station are not aligned to each other.

37. The communication system of claim 36, wherein the controller is configured to control the relay station to transmit downlink control information for a mobile station to the mobile station in the downlink subframe,
wherein the downlink control information for the mobile station is transmitted during first to third symbols of the first slot.

38. The communication system of claim 37, wherein the location of the first symbol is determined by a system bandwidth and the system bandwidth is larger than 10 resource blocks.

* * * * *